United States Patent
Ernst et al.

(10) Patent No.: US 9,097,276 B2
(45) Date of Patent: Aug. 4, 2015

(54) BEARING PART AND THERMAL SPRAY METHOD

(71) Applicant: Sulzer Metco AG, Wohlen (CH)

(72) Inventors: Peter Ernst, Stadel b. Niederglatt (CH); Bernd Distler, Wohlen (CH)

(73) Assignee: OERLIKON METCO AG, Wohlen (CH)

( * ) Notice: Subject to any disclaimer, the term of this patent is extended or adjusted under 35 U.S.C. 154(b) by 148 days.

(21) Appl. No.: 13/906,697

(22) Filed: May 31, 2013

(65) Prior Publication Data

US 2013/0323528 A1    Dec. 5, 2013

(30) Foreign Application Priority Data

Jun. 1, 2012  (EP) .................................. 12170426
Jun. 8, 2012  (EP) .................................. 12171373

(51) Int. Cl.

| | |
|---|---|
| *C22C 9/02* | (2006.01) |
| *C23C 4/08* | (2006.01) |
| *F16C 9/04* | (2006.01) |
| *C23C 4/12* | (2006.01) |
| *C22C 9/00* | (2006.01) |
| *C23C 24/04* | (2006.01) |
| *C23C 30/00* | (2006.01) |
| *F16C 33/00* | (2006.01) |
| *C09D 1/00* | (2006.01) |
| *C23C 24/08* | (2006.01) |
| *F16C 33/14* | (2006.01) |
| *F16C 33/30* | (2006.01) |
| *B23K 35/30* | (2006.01) |
| *F16C 33/12* | (2006.01) |
| *C22C 1/02* | (2006.01) |

(52) U.S. Cl.
CPC . *F16C 9/04* (2013.01); *B23K 35/30* (2013.01); *C09D 1/00* (2013.01); *C22C 1/02* (2013.01); *C22C 9/00* (2013.01); *C22C 9/02* (2013.01); *C23C 4/08* (2013.01); *C23C 4/12* (2013.01); *C23C 24/04* (2013.01); *C23C 24/08* (2013.01); *C23C 30/00* (2013.01); *F16C 33/00* (2013.01); *F16C 33/121* (2013.01); *F16C 33/14* (2013.01); *F16C 33/30* (2013.01); *F16C 2204/34* (2013.01); *Y10T 428/12479* (2015.01); *Y10T 428/12715* (2015.01); *Y10T 428/12722* (2015.01)

(58) Field of Classification Search
None
See application file for complete search history.

(56) References Cited

U.S. PATENT DOCUMENTS

| | | | | |
|---|---|---|---|---|
| 2,048,247 | A | * | 7/1936 | Davis ............................ 384/125 |
| 2,287,884 | A | * | 6/1942 | Jominy ......................... 277/442 |
| 2,350,398 | A | * | 6/1944 | Hufferd ......................... 403/75 |
| 4,117,580 | A | * | 10/1978 | Heck ........................ 29/898.059 |
| 4,435,448 | A | * | 3/1984 | Nolt, Jr. ......................... 427/234 |
| 5,692,726 | A | * | 12/1997 | Adachi et al. ................. 251/368 |
| 6,416,877 | B1 |  | 7/2002 | Perrin |
| 7,449,249 | B2 |  | 11/2008 | Barbezat |
| 8,636,124 | B2 | * | 1/2014 | Beardsley et al. ...... 191/22 DM |
| 2003/0049148 | A1 |  | 3/2003 | Takayama et al. |
| 2006/0063023 | A1 |  | 3/2006 | Barbezat |
| 2013/0142950 | A1 |  | 6/2013 | Arndt et al. |
| 2013/0216169 | A1 |  | 8/2013 | Zidar |
| 2013/0319367 | A1 | * | 12/2013 | Distler et al. .............. 123/197.3 |

FOREIGN PATENT DOCUMENTS

| | | | |
|---|---|---|---|
| DE | 2258295 | A1 | 3/1974 |
| DE | 3532706 | * | 3/1987 |
| DE | 4118469 | A1 | 12/1992 |
| DE | 10158622 | A1 | 6/2003 |
| DE | 102006060474 | A1 | 6/2008 |
| DE | 102007019510 | B3 | 9/2008 |
| DE | 102010022597 | A1 | 12/2011 |
| EP | 0517191 | A1 | 12/1992 |
| EP | 0926340 | A2 | 6/1999 |
| EP | 1637623 | B1 | 3/2006 |
| EP | 2133580 | A1 | 12/2009 |
| GB | 589325 | * | 6/1947 |
| GB | 2285290 | A | 7/1995 |
| JP | 5-339700 | * | 12/1993 |
| JP | 7-18324 | * | 1/1995 |
| JP | 2001-335914 | * | 12/2001 |
| JP | 2005076075 | A | 3/2005 |
| JP | 2007-56327 | * | 3/2007 |
| JP | 2008-256085 | * | 10/2008 |
| WO | 0023718 | A1 | 4/2000 |
| WO | 2007131742 | A1 | 11/2007 |
| WO | 2008074281 | A2 | 6/2008 |
| WO | 2008131837 | A2 | 11/2008 |
| WO | 2011127513 | A1 | 10/2011 |
| WO | 2012012818 | A1 | 2/2012 |

OTHER PUBLICATIONS

Abstract for JP361250181A. One page. Nov. 7, 1986.*
European Search Report of EP patent application 13168661, Sep. 2, 2013.

* cited by examiner

*Primary Examiner* — David Sample
*Assistant Examiner* — Nicholas W Jordan
(74) *Attorney, Agent, or Firm* — Greenblum & Bernstein, P.L.C.

(57) ABSTRACT

The invention relates to a bearing part as well as to a spray method for manufacturing a layer system on a bearing part, such as, in particular, a connecting rod eye of a connecting rod for a reciprocating piston combustion engine, with a layer system containing at least tin being provided on a surface of the bearing part. In accordance with the invention, an outer, thermally sprayed, top layer of the layer system is composed only of tin with the exception of contaminants.

12 Claims, No Drawings

BEARING PART AND THERMAL SPRAY METHOD

CROSS-REFERENCE TO RELATED APPLICATION

The present application claims priority under 35 U.S.C. §119 of European Patent Applications No. 12170426.6, filed Jun. 1, 2012, and Ser. No. 12/171,373.9, filed Jun. 8, 2012, and the disclosures of which are expressly incorporated by reference herein in their entireties.

BACKGROUND

The invention relates to a bearing part and to a thermal spray method for producing a layer system on a bearing part, in particular a connecting rod eye of a connecting rod for a reciprocating piston combustion engine.

Bearing devices of all kinds, e.g., plain bearings and roller element bearings, represent the predominant portion of bearings used in engineering. Bearings or bearing devices are to be understood in the following as all bearing parts which define the function of the bearing, e.g., bearing parts rolling off or sliding off on one another or supported in one another, and which cooperate in supporting contact.

As a rule, wear phenomena, particularly at the bearing running surfaces, are associated with the friction arising at the bearing running surfaces cooperating in bearing contact. Plain bearings are used in an almost countless number of embodiments in this respect. For example, plain bearings are used in reciprocating piston combustion engines as crankshaft bearings, big end bearings, thrust bearings, crosshead pivot bearings, and propeller shaft bearings or in many other applications.

A plain bearing and a method of manufacturing a plain bearing are disclosed in WO 00/23718, for example, wherein a coating composed of white metal is alloyed to a carrier part composed of an iron material. The forming of an alloy, however, requires the presence of liquid alloy components so that, accordingly, a large amount of heat is released in the coating process, whereby not only the white metal melts, but also a metal bath composed of molten base material is produced at the upper side of the carrier part at the running surface side. The melts of white metal and iron material thus produced can alloy with one another, with $FeSn_2$ arising to a large amount. Accordingly, a comparatively thick connection zone largely composed of $FeSn_2$ arises in this respect. This connection zone admittedly produces a good metallurgic connection between the base material and the coating, but $FeSn_2$ represents a very brittle material so that a formation of cracks and brittle fracture can already occur at smaller loads on the known bearing arrangement. In addition, there is the fact that, in the event of an unfavorable cooling, a conversion of the iron material close to the coating to Martensite can take place which is likewise very brittle, whereby the aforementioned disadvantage is further intensified.

The consequence is that, with a bearing of the previously described kind, a correspondingly short service life results as a consequence of the high brittleness and the small stretchability within a comparatively thick intermediate region between the steel of the base material and the white metal bearing layer.

To avoid this, it is also known to apply a coating composed of a bearing metal such as white metal to the carrier part in a centrifugal casting process. In this respect, the formation of a metal bath composed of molten base material is admittedly suppressed. On the solidification of the white metal applied in the centrifugal casting process, a separation of the alloy components can, however, occur in that needle-shaped crystals composed of $Cu_6Sn_5$ are first precipitated and then cubic crystals composed of SbSn and finally the remaining tin-rich matrix solidifies.

The density of $Cu_6Sn_5$ is larger, that of SbSn smaller than the density of the matrix which is liquid longer. The $Cu_6Sn_5$ crystals accordingly migrate radially outwardly and in so doing weaken the region at which the white metal coating adjoins the base material, which can likewise have an unfavorable effect on the service life.

To avoid these problems and related problems, a plain bearing and a method of manufacturing a plain bearing is proposed in WO 2007/131 742 A1 in which a relatively thin connection zone containing $FeSn_2$, which is at most 10 μm thick, is formed between the pure white metal layer and the base material containing iron.

This solution, however, only represents a compromise since the $FeSn_2$ layer is admittedly relatively thin, but is actually still present so that the problem of the brittle fracture and of crack formation is still not conclusively solved. The problem of brittle fracture and of crack formation for plain bearings which are exposed to enormously high loads, for example crankshaft bearings of internal combustion engines, is in particular still present because the deformation capability of the plain bearings in accordance with WO 2007/131 742 A1 is not sufficient by a large amount.

To avoid these problems in principle and to prevent the replacement of the complete bearing in the event of wear of the bearing surfaces, bearing shells are, inter alia, also used in plain bearings which are inserted into the bearing and which can be replaced after their wear, i.e., so-called split plain bearings with bearing shells are used. In part, a combined support in plain bearings and in roller element bearings is also used. The shafts are, as a rule, in this respect forged or sintered from forged steels or spherulitic graphite cast iron, the counterparts from heat treatable steels or are in part also manufactured from annealed cast iron. The bearing shells are usually realized as so-called two-layer bearings or three-layer bearings.

The constructive structure of the plain bearing is, however, thereby made substantially more complex and, in addition, a cost-intensive maintenance process becomes necessary with the exchange of the bearing shells. In addition, the manufacture of such bearing shells is relatively complex and/or expensive. With high operational performance rates of the machine, the bearing shells moreover wear prematurely so much that the changing of the bearing shells becomes necessary, with the changing of the bearing shells in such machines such as were mentioned above being associated with high costs.

However, with other types of bearings, e.g., with ball bearings, the premature wear of the bearing parts, that is for example of the balls of the ball bearings, of an axle to be supported by the ball bearing, a cage for the balls of the ball bearings or other bearing parts of the ball bearing, is a basic problem which causes a substantial effort and/or costs for repairs and maintenance and is ultimately associated with substantial costs.

A spray powder for manufacturing a bearing layer on a bearing part via a thermal coating process has therefore been proposed to solve these and further problems in EP 1 637 623 B1, said spray powder containing up to 30% zinc, up to 10% tin, up to 3% silicon, up to 7% aluminum, up to 2% iron, up to 4% manganese, up to 3% cobalt, with the remaining difference to 100% being copper. All figures in this respect are in percent by weight.

A spray powder is thus provided by EP 1 637 623 B1 with which a surface layer containing copper is applied to a bearing part via a thermal coating process so that the problems with the white metal coatings, which are applied via centrifugal coasting, for example, are avoided in the same way as the problems with the complex split bearings with bearing shells.

The corresponding components of the spray powder in accordance with EP 1 637 623 B1 are in this respect, on the one hand, iron, cobalt, manganese and silicon which are deposited as intermetallic phases or compounds in the sprayed layer on cooling in the form of a hard phase so that isolated regions arise in the layer which form spatially isolated hard phases of intermetallic phases or intermetallic compounds of iron, cobalt, manganese and silicon. The hard phases form relatively hard regions, that is, regions with high hardness, in the otherwise soft base matrix containing copper which is substantially made up of copper, aluminum and zinc and thus form a copper-aluminum-zinc base matrix, which form a soft base matrix containing copper in relationship to the enclosed regions of the hard phases.

Although the bearing layers formed from the spray powder in accordance with EP 1 637 623 B1 have shown exceptional mechanical properties, it has unfortunately been found, however, that the zinc portion can have the result that zinc abrasion can enter into the lubrication oil lubricating the bearings, at least for specific applications, which can, under certain circumstances, dependent on the chemical composition of the lubrication oil used, result in a type of zinc poisoning of the lubrication oil, that is which can negatively influence its properties. In addition, the manufacture of the spray powder in accordance with EP 1 637 623 B1 is complex and thus expensive due to its relatively complicated chemical composition.

A further disadvantage of the bearings in accordance with EP 1 637 623 B1 is that, depending on the application and and the specific bearing type, the running-in behavior of the bearing layer is not ideal. Since the coating of EP 1 637 623 B1 is actually configured so that it is particularly resistant to mechanical wear and thus has a long life, this coating can as a rule not ensure that, for example, the counterparts of a bearing provided with this coating are ideally matched to one another or are run in ideally geometrically or with respect to friction after a running-in time, which normally characterizes a good running-in behavior of a bearing layer.

DESCRIPTION OF THE INVENTION

The invention improves the sliding properties of a surface of a bearing part by applying a thermal spray layer and also provides an improved and constructively simpler bearing device which in particular also avoids the problems with zinc abrasion known from the prior art and additionally ensures a good running-in behavior of the counterparts of the bearing. The invention accordingly provides a thermally sprayed layer system on a bearing part, said layer system being of a chemical composition which is as simple as possible, and to provide a corresponding thermal spray method with which such a bearing layer can be manufactured on a bearing part.

The invention thus relates to a bearing part, in particular to a connecting rod eye of a connecting rod for a reciprocating piston combustion engine, with a layer system containing at least tin being provided on a surface of the bearing part. In accordance with the invention, an outer, thermally sprayed, top layer of the layer system is composed only of tin with the exception of contaminants.

In a particular embodiment, the top layer is, except for technically unavoidable contaminants, a pure tin layer which is thermally sprayed directly onto the substrate material of the bearing part.

It has been found that in the thermal spraying of tin, for example onto a substrate containing iron, the harmful $FeSn_2$ connection zones known from the prior art essentially do not arise. The reason for this is presumably that the thermally sprayed tin becomes solid so fast on the surface of the relatively cold substrate that a diffusion process for forming the $FeSn_2$ can substantially not take place. It is thus possible for the first time, via the invention, to realize the positive bearing properties of a pure tin layer even on substrates containing iron without having to accept the disadvantages of the $FeSn_2$ diffusion layers known from the prior art.

In this respect, the tin top layer has exceptional bonding, that is, adhesion, on the substrate due to the thermal spray process, and indeed without forming any connection zone between the base material and the tin top layer so that the known problems with the brittle $FeSn_2$ connection zone do not arise at all and so that therefore no formation of cracks and/or brittle fracture can occur with a bearing part in accordance with the invention even if the pure tin top layer is applied by thermal spraying directly on the bearing part without any intermediate layer and even under high and long-term loads.

At the same time, the layer system in accordance with the invention, in contrast to the Cu-based layer system of EP 1 637 623 B1, has the exceptional properties known from layers containing tin, for example of white metal, so that the parts of a bearing coated in accordance with the invention and supported in one another can be ideally matched and bedded in with respect to one another, whereby the performance capability, wear resistance and service life of bearing parts in accordance with the invention are dramatically improved or increased in comparison with the prior art.

It is in this respect also possible for very special applications that an intermediate layer is provided between the surface of the substrate and the top layer which can, for example, ensure an even better adhesion of the tin top layer on the substrate or which can simultaneously or alternatively compensate a lack of hardness of the substrate material of the bearing part.

The intermediate layer, onto which the tin top layer in accordance with the invention is thermally sprayed, can in this respect in principle be any suitable intermediate layer which can be composed of the most varied materials depending on the demands.

In this respect, an intermediate layer containing copper is particularly applied between the substrate material of the bearing part and the top layer via a thermal spray method.

In an embodiment particularly important for practice, an intermediate layer of the invention does not contain any zinc so that the harmful effects of coatings containing zinc known from the prior art are avoided.

Even if a layer system in accordance with the invention always includes a top layer of pure tin, except for unavoidable contaminants, which in principle naturally covers any intermediate layers possibly additionally arranged beneath the top layer, it can often not be completely precluded that in the operating state zinc abrasion of intermediate layers containing zinc occurs over time which can, for example, cause the zinc poisoning of the lubrication oil known from the prior art. An intermediate layer of the present invention therefore can be provided that does not contain any zinc even if a zinc portion is in principle possible in the intermediate layer in certain very specific applications.

In a particular embodiment, an intermediate layer of the invention is thus a zinc-free thermal spray layer which has the following composition except for unavoidable contaminants: tin=5% to 30% by weight, aluminum=0.1% to 5% by weight, iron=at most 1% by weight, and copper=difference to 100% by weight.

A second important feature of an intermediate layer in accordance with the invention is thus a tin content of 5% to 30% by weight in conjunction with a relatively small proportion of aluminum which lies between 0.1% and at most 5% by weight.

If an intermediate layer is provided between the substrate material of the bearing part and the top layer, it is, however, not always, but frequently, the case that the top layer of tin is essentially responsible for the provision of good running-in properties and then has a reduced thickness. Depending on how the run-in procedure specifically takes place, it is by all ways possible in this respect that the tin top layer becomes very thin at at least various points of the surface or is even completely removed by the running-in process at specific points so that the chemical and physical properties of the intermediate layer absolutely become essential in every respect for the function of the layer system in accordance with the invention since the intermediate layer is then no longer completely covered by the tin top layer.

It is in this respect actually known in principle that aluminum, on the one hand, can have a very positive influence on the mechanical properties and can in particular significantly improve the corrosion resistance of a thermal spray player. It had therefore previously been assumed in the prior art that a relatively high aluminum content is necessary to be able to ensure a good corrosion resistance of the thermal spray layer. It has, however, also been shown that a high proportion of aluminum in the thermal spray powder has the result in the thermal spraying that aluminum oxide (predominantly $Al_2O_3$) is formed in the thermal spray layer, which again negatively influences the friction properties of the thermal spray layer.

A further finding of the invention is therefore that, with a high aluminum content in the intermediate layer, an aluminum matrix can form in which more or less isolated tin phases may be distributed. Due to the relatively high cooling and solidifying rates in thermal spraying, a portion of the tin can be deposited in a saturated solution in the aluminum matrix. The remainder of the tin is then formed in the aluminum matrix in the form of particles of different sizes, that is in the form of particles which have sizes which are too low so that the so-called anti-scuffing properties of the layer are negatively influenced, such that the mutually rubbing sliding partners, for example the sliding partners of a bearing, increasingly tend to scuffing, which naturally has to be prevented at all costs for obvious reasons.

On the other hand, a high tin proportion can significantly improve the anti-scuffing properties of the thermal spray layer so that ultimately a thermal spray layer is made possible by an intermediate layer of the present invention which optimizes all the essential features of a thermally sprayed bearing layer simultaneously. In this respect, the tin proportion may not, however, exceed a predefinable limit since the thermal spray layer otherwise wears mechanically too fast. The function of the intermediate layer is namely not the function of a run-in layer. This function is taken over, when required, in a layer system in accordance with the invention by the tin top layer.

That is, the combination in accordance with the invention of a relatively low aluminum content between 0.1% and at most 5% by weight with a tin content of at least 5% up to a maximum of 30% by weight in the thermal spray powder results in a thermally sprayed intermediate layer of substantially the same composition which for the first time simultaneously optimizes both the anti-scuffing properties of the thermal spray layer and the corrosion resistance as well as the friction properties, that is, a coefficient of friction of the thermal spray layer which is as small as possible. One of the major findings of the invention is in this respect that a relatively small proportion of 0.1% to 5% by weight of aluminum is sufficient in the composition of the spray powder in accordance with the invention to ensure, on the one hand, sufficient corrosion resistance of the thermal spray layer, with simultaneously the formation of unwanted aluminum oxide (predominantly $Al_2O_3$) being suppressed to a sufficiently low measure.

In this respect, the intermediate layer can contain between 15% and 25% by weight tin, specifically approximately 20% by weight tin, and/or between 0.5% and 2% by weight aluminum, preferably 1% by weight aluminum, and/or the intermediate layer can contain at most 0.5% by weight iron, preferably at most 0.2% by weight iron.

The intermediate layer can in this respect have a porosity of, for example, 0.5% to 5% by volume, in particular between 1% and 3% by volume.

In practice, the size of the particles of the thermal spray powder used in this respect lies between 5 μm and 120 μm, or lies between 10 μm and 60 μm, and depending on the application can also, e.g., be between 60 μm and 120 μm, with the spray powder used being able to be manufactured, for example, by gas atomization, water atomization, sintering, spray drying, mechanical alloying, or in any other suitable manner.

Finally, the invention also relates to a spray method for manufacturing a layer system on a bearing part of the present invention, with the spray method being a thermal spray method, such as, in particular, an atmospheric plasma spray method, a vacuum plasma spray method, an HVOF method, a plasma spray method, or a cold gas spray method.

The invention claimed is:

1. A bearing part comprising:
    a layer system containing at least tin on a surface of the bearing part;
    the layer system comprising:
        a thermally sprayed top layer consisting essentially of tin; and
        a thermally sprayed intermediate layer between the surface of the bearing part and the top layer;
        wherein the thermally sprayed intermediate layer is a zinc-free layer consisting essentially of:
            5 to 30 wt % tin;
            0.1 to 5 wt % aluminum;
            at most 1 wt % iron; and
            remainder copper.

2. A bearing part according to claim 1, wherein:
    the bearing part is a connecting rod eye for a connecting rod for a reciprocating piston combustion engine.

3. A bearing part according to claim 1, wherein:
    the thermally sprayed top layer is in direct contact with the surface of the bearing part.

4. A bearing part according to claim 1, wherein:
    the intermediate layer contains between 15 and 25 wt % tin.

5. A bearing part according to claim 1, wherein:
    the intermediate layer contains about 20 wt % tin.

6. A bearing part according to claim 1, wherein:
    the intermediate layer contains between 0.5 and 2 wt % aluminum.

7. A bearing part according to claim 1, wherein:
the intermediate layer contains about 1 wt % aluminum.

8. A bearing part according to claim 1, wherein:
the intermediate layer contains at most 0.5 wt % iron.

9. A bearing part according to claim 1, wherein:
the intermediate layer contains at most 0.2 wt % iron.

10. A bearing part according to claim 1, wherein:
the intermediate layer has a porosity of 0.5% to 5% by volume.

11. A bearing part according to claim 1, wherein:
the intermediate layer has a porosity of 1% to 3% by volume.

12. A method of producing the bearing part of claim 1, comprising spraying the top layer and intermediate layer onto the bearing part by means of any one of the following thermal spray methods:
an atmospheric plasma spray method;
a vacuum plasma spray method;
an HVOF method;
a flame spray method;
a cold gas spray method.

\* \* \* \* \*